United States Patent

Huschle et al.

[15] 3,678,838
[45] July 25, 1972

[54] RESILIENT STOP FOR A PHOTOGRAPHIC SHUTTER

[72] Inventors: Peter Huschle, Marktplatz; Helmut Ettischer, Ruit/Wurtt, both of Germany

[73] Assignee: Eastman Kodak Company, Rochester, N.Y.

[22] Filed: Aug. 19, 1970

[21] Appl. No.: 65,036

[52] U.S. Cl. ..................................................... 95/59
[51] Int. Cl. ......................................................... G03b 9/10
[58] Field of Search .................................. 95/53 R, 58, 59, 60

[56] References Cited

UNITED STATES PATENTS 2,877,699  3/1959  Fairbank ..................................... 95/59

Primary Examiner—Samuel S. Matthews
Assistant Examiner—Monroe H. Hayes
Attorney—Robert W. Hampton and William F. Delaney, Jr.

[57] ABSTRACT

Shutter mechanism for a photographic camera in which a shutter blade is opened by a spring loaded impact driver controlled by a shutter release lever. When the blade is driven open it strikes a resilient stop which absorbs the impact energy of the shutter blade and returns the shutter blade softly for engagement by a latch device. The impact energy imparted by the blade to the resilient stop can be employed for various functions, such as the actuation of a switch in an electronic timing circuit that controls shutter speed.

3 Claims, 4 Drawing Figures

PETER HUSCHLE
HELMUT ETTISCHER
INVENTORS

BY William F. Delaney Jr.

Robert W. Hampton

ATTORNEYS

RESILIENT STOP FOR A PHOTOGRAPHIC SHUTTER

BACKGROUND OF THE INVENTION

1. Field of the Invention

This invention relates to photographic apparatus and, more particularly, to an improved shutter mechanism having an impact actuated shutter blade.

2. Description of the Prior Art

Photographic shutters having blades that are adapted to strike a resilient stop in their path of travel and rebound to their initial position are well known in the art. The stop in such devices reduces the reversing time of the blades to obtain shorter exposure times. It is further known to adjust the position of the stop for varying the duration of the exposure interval.

Photographic shutters in which the shutter speed is automatically controlled in accordance with the intensity of scene illumination are also well known in the art. Such shutter systems often include a shutter blade biased towards its covering position and an impact driver that strikes the blade and drives it against its bias to an uncovering position where it actuates a latch that retains it until the exposure interval is terminated in response to a trigger signal from a photoelectric timing circuit. The latch device must be located at a position along the path of travel of the blade at which the blade has enough energy to override the latch to actuate it. However, if the blade overrides the latch with excessive energy, it will travel too far past the latch and return to the latch with considerable bias force. In the latter situation the force of the shutter blade striking the latch on the upswing as well as the down swing will tend to wear out the latch device and reduce its reliability. Therefore, a stop detent sometimes is used to dissipate the energy of the blade and restrict its travel beyond the latch, but such devices can impart excessive forces on the blade and may cause the blade to rebound violently against the latch device.

SUMMARY OF THE INVENTION

It is an object of the present invention to provide an improved shutter apparatus which is particularly adapted for control by an electronic timing apparatus.

Another object of the invention is to provide an improved shutter apparatus which securely latches the "opening" shutter blade in its open position.

Yet another object of the invention is to provide secure latching without requiring the use of additional camera structure.

These an other objects are accomplished, according to the preferred embodiments of the invention, by shutter apparatus having a blade driven by an impact driver to an open position where the blade strikes a resilient stop member which is adapted to absorb the blade energy and return the blade for latching by a latch device, and to provide an additional camera function by means of the impact energy imparted by the blade.

The invention and its objects and advantages will become more apparent in the detailed description of the preferred embodiments presented below.

BRIEF DESCRIPTION OF THE DRAWINGS

In the detailed description of the preferred embodiments of the invention presented below, reference is made to the accompanying drawings, wherein corresponding parts are identified by like numerals and in which.

DESCRIPTION OF THE PREFERRED EMBODIMENTS

Figure 1:
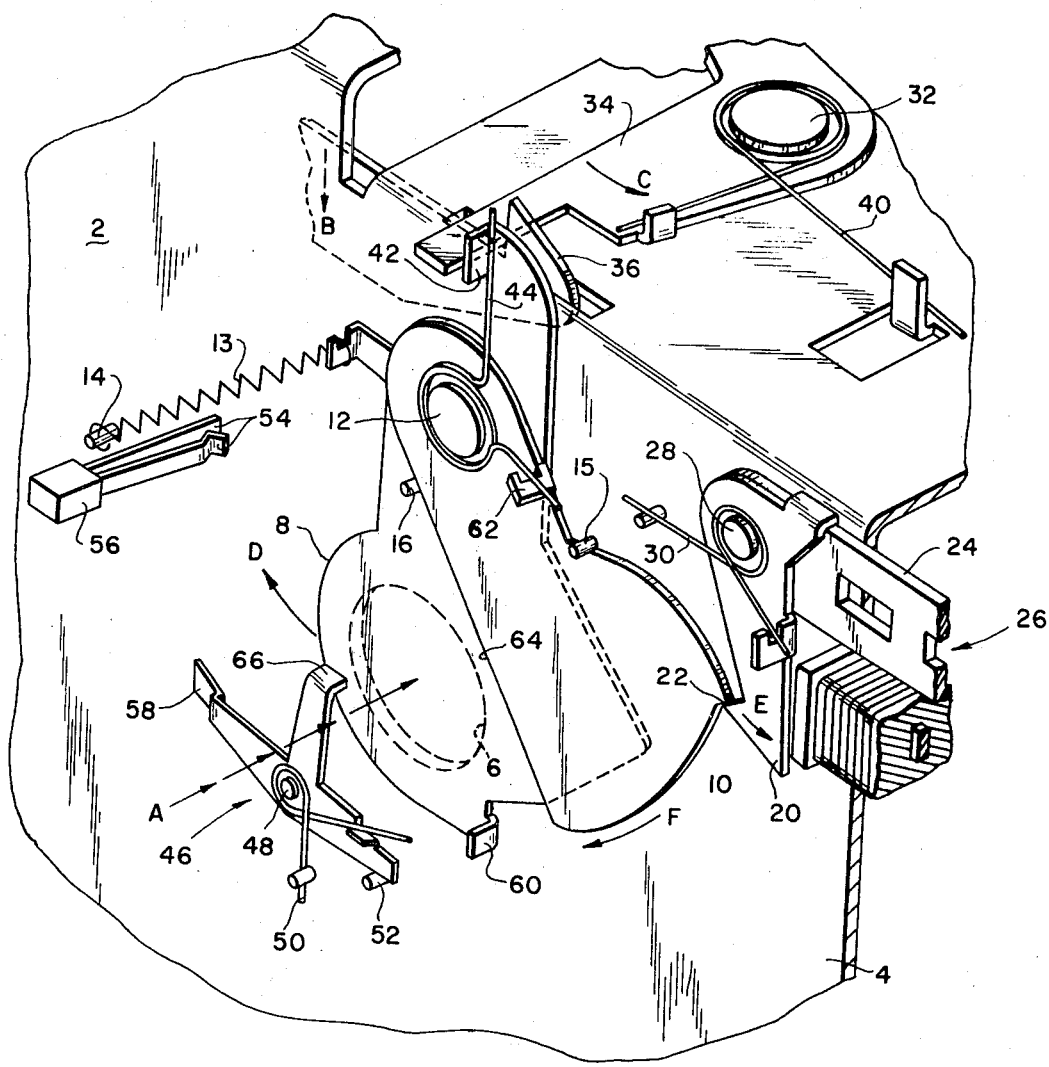
FIG. 1 is a fragmentary perspective view of a shutter mechanism incorporating one embodiment of the invention with the shutter blades and an impact driver shown in their initial or "cocked" positions.

Referring now to the drawings and in particular to FIG. 1, there is shown a shutter assembly 2 according to the invention which is adapted for use in a photographic apparatus such as a camera. Certain portions of such photographic apparatus, well known in the art, are mentioned herein without detailed description since they are not considered part of the present invention.

Assembly 2 includes a mounting plate 4 which supports the various elements of the assembly. Mounting plate 4 is provided with an exposure aperture 6 through which light from an object scene is selectively transmitted in the direction of arrow A to effect exposure of a medium such as a photographic film (not shown).

An opening shutter blade 8 and a closing shutter blade 10 are mounted on the plate 4 adjacent the exposure aperture 6 for pivotal movement about a common pivot 12. Opening blade 8 is normally positioned in its initial or aperture covering position in which it is in alignment with the exposure aperture 6. Closing blade 10 is normally positioned in its initial or uncovering position located wholly to one side of exposure aperture 6.

Shutter blade 8 is resiliently biased in a counterclockwise direction towards its initial position, as shown, by a return spring 13 having one end attached to the opening blade 8 and the other end attached to a pin 14 mounted on mounting plate 4. The spring 13 also biases the closing blade 10 to its initial position against a detent 15 by means of another detent 15 on the opening blade 8 which engages an edge of the closing blade. Closing blade 10 is additionally held in its initial position by a holding pawl 20 which engages an offset portion 22 of closing blade 10. Holding pawl 20 is pivotably mounted on a yoke 24 of an electromagnet 26 about a pivot 28 and is biased in a clockwise direction by a hair spring 30.

Pivotably mounted on a pivot 32 of mounting plate 4 is a drive lever or striker 34. Drive lever 344 is brought into the cocked position shown in FIG. 1 during film feed movement by means (not shown) associated with a film transport mechanism (also not shown) in which position it abuts a hook 36 of a shutter release member 38 (see FIG. 4) adjacent a bent end portion 42 of the opening blade 8 under the bias of a drive spring 40.

Figure 4:
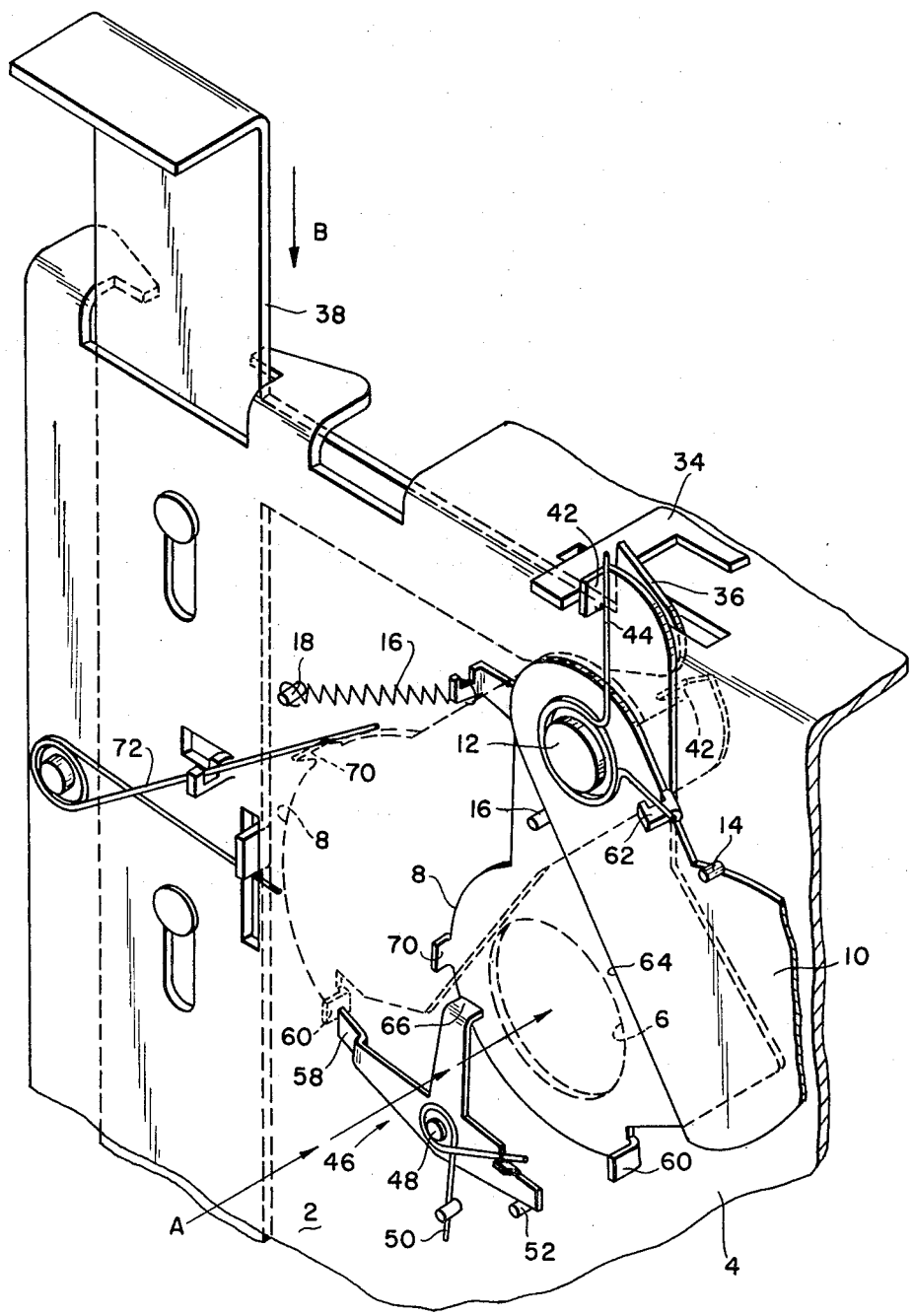
FIG. 4 is a fragmentary perspective view of a shutter mechanism according to a third embodiment of the invention shown in its cocked condition with the uncovering position of the opening blade shown in phantom.

Shutter assembly 2 is actuated by depression of shutter release 38 downwardly in the direction of arrow B (see FIG. 4). The downward movement of shutter release 38 moves the hook 36 downwardly to release the drive lever 34 for movement in the direction of arrow C. The drive lever 34 under the force of the drive spring 40 strikes the bend end portion 42 of the opening blade 8 which is thereby pivoted in the direction of arrow D from the covering position shown in FIG. 1 to the uncovering position shown in FIG. 2 in which the aperture 6 is cleared to initiate an exposure.

Figure 2:
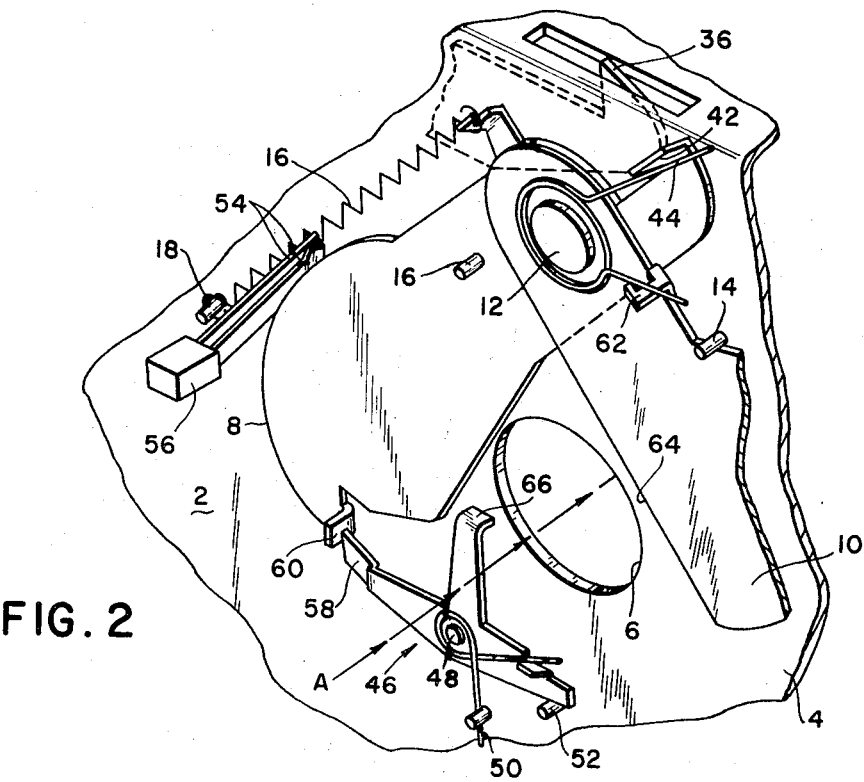
FIG. 2 is a fragmentary perspective view of a portion of the apparatus shown in FIG. 1 with the aperture cleared for exposure.

During its pivotal movement in the direction of arrow D, the opening blade 8 increases the tension of return spring 13 and of a restoring spring 44, described in further detail below, and moves past a latch member 46 pivotably mounted about a pivot 48 on the mounting plate 4 and biased by a hair spring 50 in a clockwise direction into engagement with a pin 52. As shown in FIG. 2, the opening blade hits the contacts 54 of a contact switch 56 mounted adjacent the return spring 16, and the blades direction of travel is thereby reversed. The contacts 54 close when struck by the opening blade 8 and move back resiliently into engagement with the return spring 13 which provides resilient support for the contacts. This arrangement permits the contacts 54 and the return spring 13 to absorb the impact energy of the opening blade 8, and control the distance the blade 8 travels beyond the latch member 46, so that the blade 8 is returned softly until a bent end portion 60 of opening blade 8 engages with a latching tab 58 on the latch member 46.

Advantageously the switch 56 forms an essential part of the camera mechanism. Since the switch 56 is provided anyway, the present invention does not complicate the shutter assembly 2 by adding further structure. For example, if the shutter assembly 2 is to be used in a camera employing electronic flash, switch 56 may serve to activate the electronic flash at full aperture. Alternatively, switch 56 can be employed as an auxiliary power switch in an electronic timing circuit (not shown) that controls actuation of the electromagnet 26, as described below. Such an auxiliary power switch enables the timing circuit to continue functioning after the principal power switch (not shown) has been reopened, for example by return of the shutter release lever to its initial position before termination of the exposure interval. Other essential camera functions which may utilize switch 56 will readily occur to those skilled in the art.

As the opening blade 8 begins its pivotal movement in the direction of arrow D, a switch (not shown) activates a control apparatus (also not shown) which determines the exposure interval necessary for proper exposure. The control apparatus which forms no part of the present invention may take various forms well known to those skilled in the art, such as an electronic timing circuit adapted to energize the electromagnet 26 a period of time after activation determined by the circuit as a function of scene illumination. Energization of electromagnet 26 attracts the holding pawl 20 against the bias of the hair spring 30 in the direction of arrow E. Movement of the holding pawl 20 in the direction of arrow E disengages the pawl 20 from the offset portion 22 of the closing blade 10, whereupon the blade 10 moves under the force of the restoring spring 44 in the direction of arrow F from its uncovering position to a covering position overlying the exposure aperture 6 to terminate the exposure. In the form shown, the restoring spring 444 is a hair spring with one leg biasing the bent end portion 42 of the opening blade 8 in a counter-clockwise direction and with the other leg biasing a lug 62 on the closing blade 10 in a clockwise direction around the pivot 12.

When the closing blade 10 moves to its covering position overlying the aperture 6, an edge 64 of the closing blade 10 abuts against an arm 66 of the latch member 46 and rotates the latch member 46 against the bias of the spring 50 so that the tab 58 is disengaged from the bent end portion 60 of the opening blade 8 and the latter is returned to its initial position shown in FIG. 1 under the force of the return spring 13. As explained above, the return motion of the return spring 13 is transmitted via the pin 16 to the closing blade 10 and moves the blade 10 against the detent 15 where the holding pawl 20 again engages the offset portion 22 of the closing blade 10.

Figure 3:
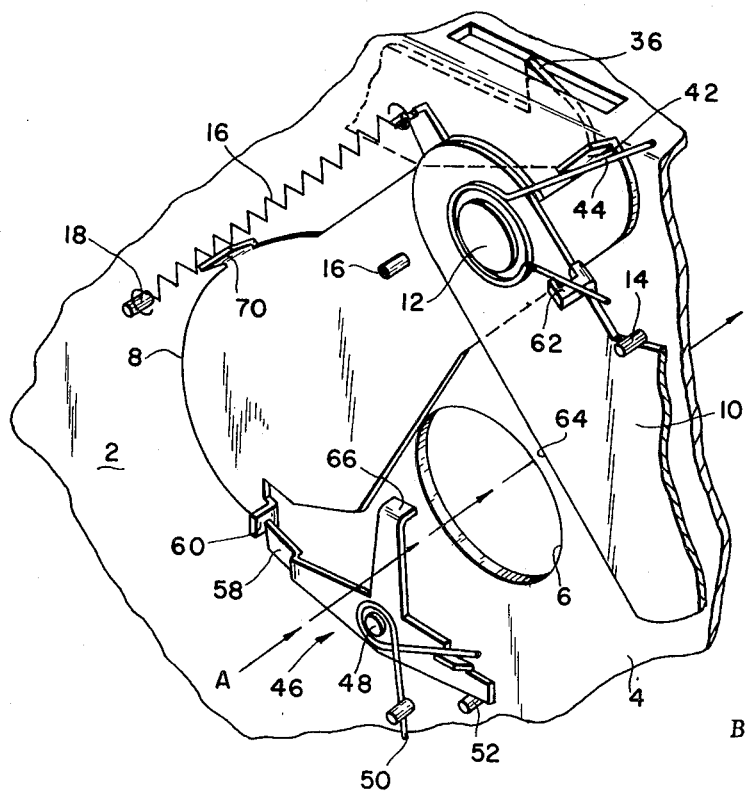
FIG. 3 is a fragmentary perspective view of a shutter mechanism according to another embodiment of the invention with the aperture cleared for exposure.

Other resilient camera of shutter elements, in addition to the contacts of a contact switch, can be used as the stop means for the opening blade 8. For example, in another embodiment of the invention shown in FIG. 3, the opening blade 8 is provided with a bent portion 70 to permit the blade to be slowed down directly by the return spring 13. In yet another embodiment of the invention shown in FIG. 4, a return spring 72 for the shutter release member 38 is used as the resilient stop member.

The invention has been described in detail with particular reference to the preferred embodiments thereof, but it will be understood that variations and modifications can be effected within the spirit and scope of the invention.

We Claim:

1. Shutter apparatus for a photographic camera having an exposure aperture, said apparatus comprising:
    a. a blade member movable along a path between a light blocking position covering said aperture and an unblocking position uncovering said aperture;
    b. spring means for biasing said blade member toward its light blocking position;
    c. means for striking said blade member to drive it against the bias of said spring means with a predetermined momentum away from its covering position and towards its uncovering positions;
    d. latch means positioned along said path to be engaged by said blade member for releasably retaining said blade member from movement toward its covering position, said blade member tending to move beyond said latch means a distance corresponding to the momentum with which said blade member engages said latch means, and
    e. resilient stop means positioned in the path of travel of said blade member as said blade member moves beyond said latch means for causing said blade member to rebound back toward said latch means with less momentum than that with which it struck said stop means, said stop means adapted to perform at least one other camera function, said blade member engaging said stop means substantially simultaneously as said stop means performs said one other camera function.

2. Apparatus as recited in claim 1 wherein said resilient stop means comprises switch means including a resilient member, said switch means disposed within the path of travel of said blade member to be engaged by said blade member for actuating a specified camera function simultaneously with the causing of said blade member to rebound back toward said latch means with less momentum than that with which it struck said switch means.

3. Shutter apparatus for a photographic camera having an exposure aperture, said apparatus comprising:
    a. a blade member movable along a path between a light blocking position covering said aperture and an unblocking position uncovering said aperture;
    b. means for striking said blade member to drive it with a predetermined momentum away from its covering position and towards its uncovering position;
    c. latch means positioned along said path to be engaged by said blade member for releasably retaining said blade member from movement toward its covering position, said blade member tending to move beyond said latch means a distance corresponding to the momentum with which said blade member engages said latch means; and
    d. spring means for biasing said blade member toward its light blocking position, and being positioned in the path of travel of said blade member to be engaged by said blade member upon movement of said blade member beyond said latch means for causing said blade member to rebound back toward said latch means with less momentum than that with which it engages said spring means.

* * * * *